UNITED STATES PATENT OFFICE.

AUGUST LEOPOLD LASKA, ARTHUR ZITSCHER, AND FELIX KUNERT, OF OFFENBACH-ON-THE-MAIN, GERMANY, ASSIGNORS TO CORPORATION OF CHEMISCHE FABRIK GRIESHEIM-ELEKTRON, OF FRANKFORT-ON-THE-MAIN, GERMANY.

DISAZO DYES AND PROCESS OF MAKING THEM.

1,042,356.     Specification of Letters Patent.     Patented Oct. 22, 1912.

No Drawing.     Application filed June 5, 1912. Serial No. 701,716.

*To all whom it may concern:*

Be it known that we, AUGUST LEOPOLD LASKA, ARTHUR ZITSCHER, doctors of philosophy, and FELIX KUNERT, chemists, citizens of the German Empire, and residents of Offenbach-on-the-Main, in the Grand Duchy of Hesse, Germany, with post-office addresses Wilhelmsplatz 18, Friedrichstrasse 31, and Bahnhofstrasse 2, respectively, have invented new and useful Improvements in Disazo Dyes and Processes of Making Them, of which the following is a specification.

Our invention relates to the production of new disazo dyestuffs, obtained by combination of tetrazo derivatives of bases of the diphenyl series with arylamids of 2:3-oxynaphthoic acid. The dyestuffs thus obtained having probably the formula

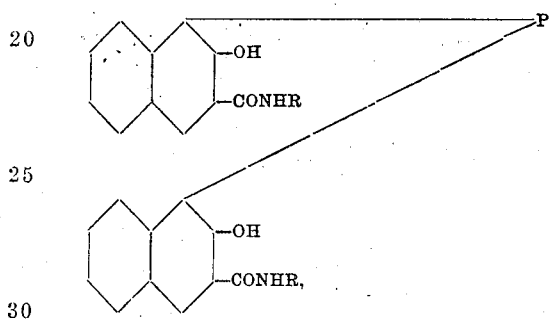

wherein P means the residue of the tetrazo compound of bases of the diphenyl series and R an aromatic radical form dark powders when dry and may be used for the production of pigment colors of black to black-blue shades. On the other hand these dyestuffs may be developed on the fiber, with or without addition of copper salts, according to the usual method of so-called ingrain dyeing; there are thus obtained beautiful black to greenish blue shades of great fastness to acid. By use of arylamids of 2:3-oxynaphthoic acid for production of blue shades on the fiber, it is possible to print on this ground color a beautiful red as an accessory color in direct printing by means of para-diazo-nitrobenzene.

The new dyestuffs yield upon reduction with stannous chlorid and hydrochloric acid a diamido base of the diphenyl series and an arylamid of 1-amino-2.3-oxynaphthoic acid.

Example: The diazo compound obtained in usual manner from 24.4 parts of dianisidin is poured into a solution of 56 parts of the anilid of 2:3-oxynaphthoic acid, 5 parts of Turkey-red oil and 70 parts of caustic soda lye of 35° Bé. in 500 parts of water, well cooled with ice. The dyestuff having probably the formula

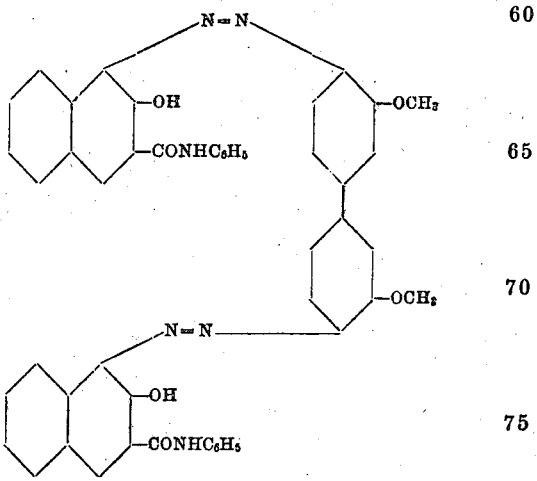

is precipitated in the form of dark blue flakes and is used for production of lakes, preferable as a paste. When dry it is a bluish black powder of metallic luster, insoluble in alcohol, soluble in concentrated sulfuric acid to a bluish green solution. In like manner the combination can be made with diphenetidin; in place of the anilid of 2:3-oxynaphthoic acid, its homologues and analogues can be used, for example the toluidid of 2:3-oxynaphthoic acid or the chloranilid of 2:3-oxynaphthoic acid.

*Production of the dyestuffs on the fiber.—* The goods are impregnated in the usual manner; for this purpose the anilid of 2:3-oxynaphthoic acid by itself or mixed with beta-naphthol, is dissolved with aid of caustic soda lye. With this solution the goods are padded, Turkey-red oil or castor oil soap and sodium acetate being used, and after drying, are printed or dyed by means of the prepared diazo solution.

Example I: The goods are padded with a solution of 25 gr. anilid of 2:3-oxynaphthoic acid, 27 cc. caustic soda lye of 34° Bé., 100 gr. sodium ricinoleate, 20 gr. sodium acetate, 40 cc. antimony solution. This antimony solution is prepared by boiling. 80 gr. tartar emetic with 200 gr. glycerin and 100 gr. caustic soda lye of 34° Bé. and making up to 1000 cc. by addition of water well dried and printed with 320 cc. diazo solution, 550 cc. tragacanth thickening, 40 cc. cupric chlorid solution of 40° Bé., 12 cc. chromic acid solution 1:10, 78 cc. water.

*Diazo solution.*—24 gr. dianisidin base are mixed with 200 cc. boiling water and 21 cc. hydrochloric acid of 21° Bé. until completely dissolved, cooled and to this mixture are added 200 gr. ice, 15 cc. hydrochloric acid of 20° Bé., and afterward during stirring 16 gr. nitrite of sodium dissolved in 50 cc. water. By addition of water the volume is made up to 1000 cc. and the whole is kept well cooled.

After printing the goods are dried, if necessary passed through the Mather Platt apparatus, washed and soaped at 50–70° C. Beautiful greenish blue prints are obtained in this way.

Example II: The goods are padded with a solution of 25 gr. anilid of 2:3-oxynaphthoic acid, 27 cc. caustic soda lye of 34° Bé., 100 gr. sodium ricinoleate, 20 gr. sodium acetate, 40 cc. antimony solution, (prepared as aforesaid,) well dried and developed in the diazo solution prepared as follows: 250 cc. diazo solution, (as mentioned in the last preceding example,) 300 gr. tragacanth thickening 1:2, 25 cc. cupric chlorid solution of 40° Bé., 8 cc. chromic acid solution 1:10, made up to 1,000 cc. by addition of water.

*Discharge.*—300 gr. hyraldite special Cassella, 700 gr. British gum thickening 1:2. The dyestuff is printed white with this discharge and finished in the usual manner.

In the same way dyestuffs are produced with other bases of the diphenyl series; for example by using the tetrazo derivative of benzidin black shades will be obtained, while the tetrazo derivative of tolidin yields blue.

Now what we claim and desire to secure by Letters Patent is the following:

1. The process of manufacturing disazo dyestuffs, consisting in combining the tetrazo derivatives of bases of the diphenyl series with arylamids of 2:3-oxynaphthoic acid.

2. As new articles of manufacture, the disazo dyestuffs, having probably the formula

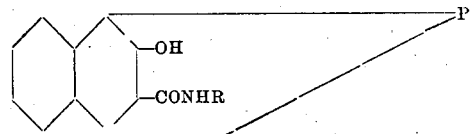
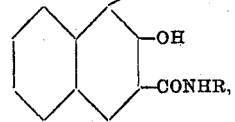

wherein P means the residue of the tetrazo compound of bases of the diphenyl series and R an aromatic radical, which may be obtained by combining the tetrazo compounds of bases of the diphenyl series with arylamids of 2:3-oxynaphthoic acid, which dyestuffs form when dry dark colored powders, and produce black to greenish blue shades developed on the fiber yielding upon reduction with stannous chlorid and hydrochloric acid a diamido base of the diphenyl series and an arlyamid of 1-amino-2:3-oxynaphthoic acid.

In testimony, that we claim the foregoing as our invention, we have signed our names in presence of two witnesses, this twenty-third day of May, 1912.

AUGUST LEOPOLD LASKA.
ARTHUR ZITSCHER.
FELIX KUNERT.

Witnesses:
PETER LAUTENSCHLAGER,
FRITZ DÉSOR.